SWITCHING SYSTEM

Filed July 15, 1955 2 Sheets-Sheet 1

INVENTORS
Glen E. Poorte &
David L. Nettleton
BY Morris A. Rabkin
ATTORNEY.

SWITCHING SYSTEM

Filed July 15, 1955 2 Sheets-Sheet 2

INVENTORS
Glen E. Poorte &
David L. Nettleton
BY Morris L. Rabkin
ATTORNEY.

United States Patent Office 2,796,597

Patented June 18, 1957

2,796,597

SWITCHING SYSTEM

Glen E. Poorte and David L. Nettleton, Haddonfield, N. J., assignors to Radio Corporation of America, a corporation of Delaware Application July 15, 1955, Serial No. 522,351

18 Claims. (Cl. 340—174)

This invention relates to cyclical data storage devices, and more particularly to a system for switching between data storage devices.

Many of the present data (information) handling systems employ cyclical data storage units such as magnetic drums, continuous strips of material, as well as other storage mediums. This stored data is generally handled by some type of computer. A program control unit of the computer controls the flow of information into, within, and out of the computer. The stored information may be in the form of characters, each comprising a group of coded binary signals.

It is often desirable to utilize an additional drum (or drums), or other cyclical medium, in order to obtain increased storage capacity. However, with this additional storage capacity goes the problem of random switching between the drums to obtain the desired information locations (drum lines). Previously this problem has been solved by a common drive, for example, a precision, interconnected gear drive, whereby the several drums are each driven at precisely the same speed or by using synchronous motors. These solutions do not always allow close packing of the stored information, or may require extended drive shafts, or elaborate gearing.

Accordingly, it is an object of this invention to provide an improved system for switching between cyclic storage media.

Another object of this invention is to provide an improved system to switch from the synchronizing control of one cyclic storage medium to the synchronizing control of another cyclic storage medium in a small amount of time.

Still another object of this invention is to provide an improved cyclic data storage system, which system is capable of storing a greater amount of information, yet is economical and provides a low access time to the information.

An additional object of this invention is to electronically switch and synchronize the synchronizing track pulses from one magnetic drum to another without waiting for the first synchronizing track pulse of the other drum to appear.

In accordance with one feature of the invention each magnetic drum (or other cyclic storage medium) of a data storage device may be driven independently. To switch between drums, a reset pulse provided by the newly selected drum resets the drum synchronizing units to await the first synchronizing pulse of the new drum.

As provided by a further important feature of the invention, the drum synchronizing units are set to the next succeeding one of a selected number of points (drum line addresses) on the new drum by appropriate synchronizing pulses from the newly selected drum. Switching time is thereby reduced, since, after setting the synchronizing unit to one of these points on the new drum, operation again continues with the next succeeding synchronizing pulse.

The novel features of this invention as well as the invention itself, both as to its organization and method of operation, will best be understood from the following description, when read in connection with the accompanying drawings, in which like reference numerals refer to like parts, in which.

The present invention may be embodied in a computing system such as that described in a copending application entitled "Information Handling System," Serial No. 478,021, filed December 28, 1954, by Lowell S. Bensky which is assigned to the assignee of the present invention. This Bensky application describes an information handling system in detail including the various operations. Only enough is included in the present application to provide a clear understanding of the present invention. The manner in which the invetion may be embodied in this or other suitable computers will be clear to those skilled in the art from the succeeding description.

Figure 1:
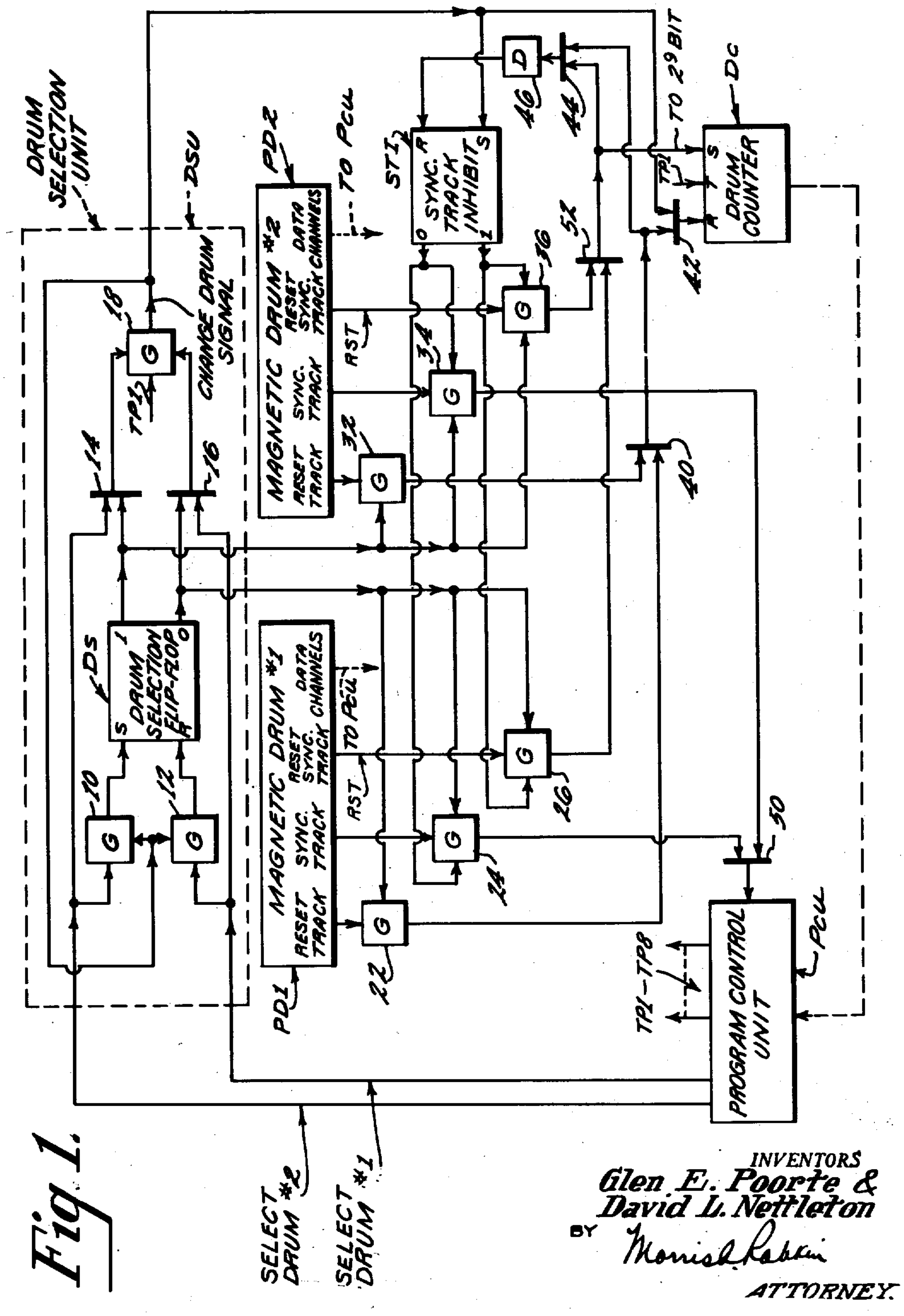
Figure 1 is a block diagram showing one manner in which this invention may be used in conjunction with a typical information handling system.

In Figure 1, one embodiment of this invention is illustrated in conjunction with the program control unit PCU of a computing system. The program control unit PCU controls the computer. The computer may include input and output units such as magnetic tapes and an arithmetic unit, all of which are well known. The program control unit PCU may receive information from and transfer information to the data channels of the magnetic drums PD1 and PD2 (or other cyclic storage media), and perform desired and specified operations upon this information. For example, the drums may provide program data storage. The program control unit provides a drum select signal to a drum selection unit DSU. This drum selection unit, which is described in some detail below, provides high level signals, that is, high voltage, for gating circuitry associated with the selected drum PD1 or PD2. In addition, the drum selection unit DSU provides an output signal if the drum select signal from the program control unit PCU calls for selection of a drum different from the drum previously (or presently) selected.

The program control unit PCU may also control a static memory (not shown for the sake of simplicity) for storing the information or data upon which the computer acts. This memory may, by way of example, comprise high speed memory banks of the type employing magnetic cores and may be assumed to include read out and read in circuits which may be respectively actuated by pulses or high levels. The information in or out is in the form of binary digits of information, or bits, as represented by the pulses (or voltage levels) on one of several leads. Seven bits in parallel in this instance may be stored at each address and written in or read out in parallel.

Program drums PD1 and PD2 are each supplied in a known manner with a synchronizing track, a reset track, and a reset synchronizing track (RST). Pulses are generated in reading heads (not shown), or other transducing means, from the synchronizing track in synchronism with lines of information written on the drum in the form of binary numbers and magnetically stored in several data channels. With the occurrence of each pulse from the synchronizing track, a timing pulse generator contained in the program control unit generates a series of eight timing pulses designated as TP1 to TP8 respectively. The drum counter DC, triggered by each first timing pulse TP1, maintains the proper address of the drum line under the reading head. Such a system for storing information on a magnetic drum is described in some detail in a copending application entitled "Method of and System for Storing Data Magnetically," Serial No. 502,647, filed April 20, 1955, by Lowell S. Bensky et al., and assigned to the assignee of the present application.

Another system operating with a magnetic drum is described in U. S. Patent No. 2,679,638, May 25, 1954, issued to Bensky et al. and assigned to the assignee of the present application.

The reset track on each of the drums PD1 and PD2 provides a single fiducial pulse from which the lines on the drums are counted. Additionally, the reset synchronizing track RST on each of the drums PD1 and PD2 provides a single fiducial pulse indicating the half way point on the magnetic drums from which the drum lines may be counted in order to minimize access time.

For illustration purposes, it will be assumed that the magnetic drums contain 1023 drum lines. Accordingly, the reset synchronizing track RST is connected to set the $2^9$ bit of the drum counter thereby setting the counter, after clearing, to the drum line 512, the half way point. The drum counter DC may be a counter of ten stages. Each of the stages therein may be a flip-flop circuit or register. The drum counter DC contains reset, set, and trigger inputs.

Briefly, when a drum select signal is provided from the program control unit PCU, a drum selection unit DSU primes a gating network connected with the selected drum, and, if the selected drum is different from that previously selected, provides a change drum signal.

The reset tracks RT from each of the magnetic drums PD1 and PD2, along with the change drum signal from the drum selection unit DSU, are connected to the reset input of the drum counter DC. The change drum signal is also connected to the set input of a synchronizing track inhibit flip-flop STI. When set, the synchronizing track inhibit flip-flop STI opens the circuit from the reset synch track to the set input of the drum counter DC. When reset, the synchronizing track inhibit flip-flop STI opens the synchronizing tracks from the selected one of the magnetic drums PD1 and PD2 to the program control unit PCU thereby enabling the generation of the timing pulses TP1 to TP8.

The change drum signal resets the drum counter and sets the synchronizing track inhibit flip-flop STI. The set output ("one" output) of the STI flip-flop opens the reset synchronizing track RST and inhibits the synchronizing track. Whichever occurs first, the fiducial reset pulse, or the fiducial reset synchronizing pulse, sets the drum counter DC to the nearest drum line 1 or drum line 512. This same pulse resets the synchronizing inhibit flip-flop STI and synchronizing pulses are again provided for the program control unit. Operation now begins synchronized with the newly selected drum.

Considering now the circuitry of Fig. 1 in detail, two outputs from the program control unit PCU, namely, the drum select lines number 1 and number 2 are coupled to the input of the drum selection unit DSU. These drum select lines 2 and 1 are connected to corresponding inputs of "and" gates 10 and 12 respectively and to corresponding inputs of "or" gates 14 and 16 respectively. The outputs of "or" gates 14 and 16 provide two of the inputs of the drum select unit output "and" gate 18. The remaining input to this output "and" gate 18 is derived from the TP1 timing pulse from the program control unit PCU. The output from the output "and" gate 18 is connected to the set input of the synch track inhibit flip-flop STI and ot the remaining inputs respectively of each of the input "and" gates 10 and 12. The output of "and" gates 10 and 12 are connected respectively to the set and reset inputs of a drum selection flip-flops DS. The corresponding 1 and 0 outputs from the drum selection flip-flop DS are connected, respectively, to the remaining inputs of the "or" gates 14 and 16.

A flip-flop is a circuit having two stable states, that is, conditions, and two input terminals, one of which is designated as set, and the other of which is designated as reset. The flip-flop may assume a set condition by application of a high level or pulse on the set input terminal S or the reset condition by the application of a high level or pulse on a reset terminal R. Two outputs are associated with the output circuit which are given Boolean tags of "one" and "zero." If the flip-flop is in the set condition, that is, "set," the "one" output voltage is high and the "zero" output voltage is low. Unless otherwise indicated, the outputs from flip-flops are taken from the "one" terminal. If the flip-flop is reset the "one" terminal is low and the "zero" terminal is high. A flip-flop may also be provided with a trigger terminal T. Application of a pulse to the trigger terminal T causes the flip-flop to assume the other condition from the one it was in when the pulse was first applied. Counters are formed from flip-flops in a known manner as was described above.

The "and" gates herein are all logical "and" gates and are indicated by rectangles with the priming inputs indicated by arrows directed toward the rectangle and the output leads leaving the rectangle.

The "or" gates shown herein function to provide an output pulse in response to an input pulse from any one of the several inputs. In the drawings in this application, a special convention is adapted for the showing of an "or" circuit. According to this convention, the inputs of the "or" circuit are indicated by arrow heads directed perpendicularly toward a solid bar. An output lead connected perpendicular to this solid line indicates the output. Also in this application, multiple leads are indicated by dotted lines. Each individual lead of these multiple leads carry, as the machine operates, a binary digit of information having only two possible voltage levels, one high and one low. These voltage levels may be either a constant voltage or in the form of pulses. Therefore, the lines themselves are sometimes designated as bits (binary digits of information).

The zero output of the drum selection flip-flop DS provides a priming input to each of the "and" gates 22, 24, and 26. These "and" gates 22, 24, and 26 also receive the outputs from the reset track, the synchronizing track, and the reset synchronizing track RST respectively of the magnetic drum PD1. Similarly, the "one" output from the drum selection flip-flop DS of the drum selection unit DSU provides a priming input to each of the "and" gates 32, 34, 36. These "and" gates 32, 34, and 36 also receive the outputs from the reset track, the synchronizing track, and the reset synchronizing track RST respectively, of the second magnetic drum PD2. The outputs of the reset track "and" gates 22 and 32 respectively are coupled to an "or" gate 40. The output of "or" gate 40 is connected through an input "or" gate 42 to the reset input of the drum counter DC. A second input to this input "or" gate 42 is derived from the change drum signal from drum selection unit DSU. The output of "or" gate 40 is also connected through an "or" gate 44, and a delay line 46 to the reset input of the synchronizing track inhibit flip-flop STI. This delay line may be composed, for example, of successive LC sections.

The 0 output of the synch track inhibit flip-flop STI provides the remaining priming inputs to the synchronizing tracks "and" gates 24 and 34, respectively. Likewise, the 1 output of the synchronizing track inhibit flip-flop STI provides the remaining priming inputs for the reset synchronizing track RST "and" gates 26 and 36. The output of each of the synchronizing track "and" gates 24 and 34 are connected through an "or" gate 50 to the program control unit PCU (the timing pulse generator from which the timing pulses TP1 through TP8 are generated). An "or" gate 52 couples the outputs of the respective reset synchronizing track "and" gates 26 and 36 to the remaining input of "or" gate 44 and thus to the reset input of the synch track inhibit flip-flop STI and to the set input to the drum counter DC ($2^9$ bit). TP1 timing pulse provides a trigger input to the drum counter DC. The "one" outputs from the drum counter DC, which reflects the drum line count of the selected magnetic drum, are connected to the inputs of the program control unit PCU wherein the recognition circuits ascertain the desired drum line in the manner described in the above mentioned Bensky application, "Method of and System for Storing Data Magnetically."

In operation assume that the magnetic drum PD1 is presently in operation. Under these conditions the drum select flip-flop DS is reset having its zero output high. The zero output provides priming pulses to each of the output "and" gates 22, 24, and 26 from the magnetic drum PD1. Also the synchronizing track inhibit flip-flop STI is in a reset condition providing a high "zero" output which also primes the synchronizing track gate 24. The synchronizing track provides synchronizing pulses corresponding to the location of each drum line. These synchronizing pulses pass through "and" gate 24 and "or" gate 50 to the program control unit PCU. The program control unit PCU generates, in response to each of these synchronizing pulses, eight timing pulses designated TP1 through TP8 in the manner described fully in the above first mentioned Bensky application.

Upon the occurrence of each TP1, the drum counter is advanced by a count of one to maintain constant count of the drum line then under the reading heads of the data channels. This count set up in the drum counter, referred to as the drum line address, is compared by the program control unit against the desired drum address. Upon equality between the desired drum address and the count provided by the drum counter DC, the program control unit opens the reading heads from the data channels on the selected magnetic drum PD1 and the desired data may be stored in or read from the given magnetic drum storage location. This operation has been described in some detail in both of the above mentioned Bensky applications and no further clarification is deemed necessary.

Assume further, for illustrative purposes, that the address of magnetic drum PD1 is, at a given instant, at drum line 700 and that of the magnetic drum PD2 is at that instant at drum line 400. Upon the advent of a select drum number 2 signal from the program control unit PCU, and address line number 608, the switching process is put into operation.

The select drum number 2 signal is received at the drum selection unit where the signal is sensed to ascertain whether a switching is involved or not. In the example given, output "and" gate 18, in the drum selection unit DSU, is activated through "or" gate 14 by the select drum number 2 signal, through "or" gate 16 by the high "zero" output of the drum selection flip-flop DS and by TP1. Thereupon "and" gate 18 provides a change drum output signal. The change drum signal from gate 18 along with the select drum number 2 signal from the program control unit PCU activates "and" gate 10. The output from gate 10 sets the drum selection flip-flop DS which provides a high level "one" output.

The high level "one" output from the drum selection flip-flop DS of the drum selection unit DSU thus provides a priming signal to each of the output "and" gates 32, 34, and 36 from the reset track, synchronizing track, and reset synchronizing track, respectively, of the magnetic drum PD2. Simultaneously therewith, the priming signal of the corresponding "and" gates 22, 24, and 26 of magnetic drum PD1 is removed.

The change drum signal from the drum selection unit DSU also resets the drum counter DC, through "or" gate 42, to zero count. In addition the change drum signal sets the synchronizing track inhibit flip-flop STI thereby removing a priming voltage level from the synchronizing track "and" gates 24 and 34 of both the magnetic drums PD1 and PD2. Removal of this priming level inhibits all of the timing pulses produced by the program control unit in response to the synchronizing signals. Setting the sync track inhibit flip-flop STI also provides a high level "one" output to prime the reset synchronizing track "and" gates 26 and 36. However, due to the action of the drum selection flip-flop DS only "and" gate 36, in the output of magnetic drum PD2, is enabled to pass a signal.

Under the conditions set up in this example with the magnetic drum PD2 at a position corresponding to drum line 400, the entire computer operation now ceases until the line 512 is reached. Then, the single fiducial pulse from the reset synchronizing track RST, corresponding to drum line 512 on magnetic drum PD2, passes through "and" gate 36 and "or" gate 52 to set the $2^9$ bit of the drum counter to the drum line address of 512. The output pulse produced by "and" gate 36, upon the occurrence of the reset synchronizing track fiducial pulse, in addition to setting the drum counter, also passes through "or" gate 44 and delay line 46 to reset the synch track inhibit flip-flop STI. Resetting the synch track inhibit flip-flop STI reverses the output levels providing a high level "zero" output and a low level "one" output. The synchronizing track inhibit flip-flop STI thereby restores the priming input to the synchronizing track "and" gate 34 and synchronizing pulses again pass through "or" gate 50 to the program control unit PCU. Thus the next succeeding synchronizing pulse from the magnetic drum PD2, namely that corresponding to drum line 513, produces the next sequence of timing pulses. Timing pulses TP1 of this sequence now triggers the drum counter DC to the count of 513, the correct drum line address. Operation is now ready to continue with information to be derived from magnetic drum PD2.

In the event that a new select drum signal is provided by the program control unit PCU to again select drum number 1 the change back is very similar to that just described, that is, the drum select unit DSU removes the priming signals from the output gates of magnetic drum PD2 and applies priming signals to the output gates 22, 24, and 26 of the PD1. Simultaneously therewith, the drum select unit DSU provides a changed drum signal disabling the synchronizing track pulses and enabling the reset synchronizing track fiducial pulse. The change drum signal resets the drum counter which is either left at the zero setting or set to 512, depending upon whether the fiducial pulse is received from the reset track (indicating the zero or reference location) or the reset synchronizing track, first. Whichever does occur first, the synchronizing track inhibit flip-flop STI is immediately reset, and the synchronizing signals again applied to the program control unit PCU. Operation now begins again.

It should be noted that, whether switching from drum 1 to drum 2, or from drum 2 to drum 1, the drum line address in the drum counter DC is set to the next half drum address i. e., zero or 512. Thus if the next half drum line is zero, the reset track fiducial pulse passes through "or" gate 40 resetting the drum counter. Under these conditions, the drum counter DC starts count upon the next timing pulse TP1 stepping the count of the drum counter DC to one to correspond with drum line number one.

By way of summary, since the two drums revolve independently, corresponding drum lines on each drum are apt to be out of synchronization. Therefore, when switching from one drum to another the drum counter is invalidated until it is reset by the reset pulse from the reset track on the drum being selected. The time required to switch between drums can be as much as the time to complete one drum revolution if the new drum has just passed its zero reference address, since the synchronization is accomplished by use of the reset pulse. In order to shorten this time interval, a third reset synchronizing track is provided for each drum. This reset synchronizing track RST contains a fiducial pulse, used for synchronizing, which is located 180 degrees from the fiducial reset pulse contained in the reset track at a reference location. The reset synchronizing pulse resets the drum line counter to 512. Thus, synchronization is accomplished by one or the other of two reset pulses depending on which passes under the reading head first. The synchronizing time can then range from zero to 512 milliseconds (for a drum having a total revolution time of 10.24 milliseconds). Or it can have an average synchronizing time of 2.56 milliseconds (¼ of the revolution time).

Figure 2:
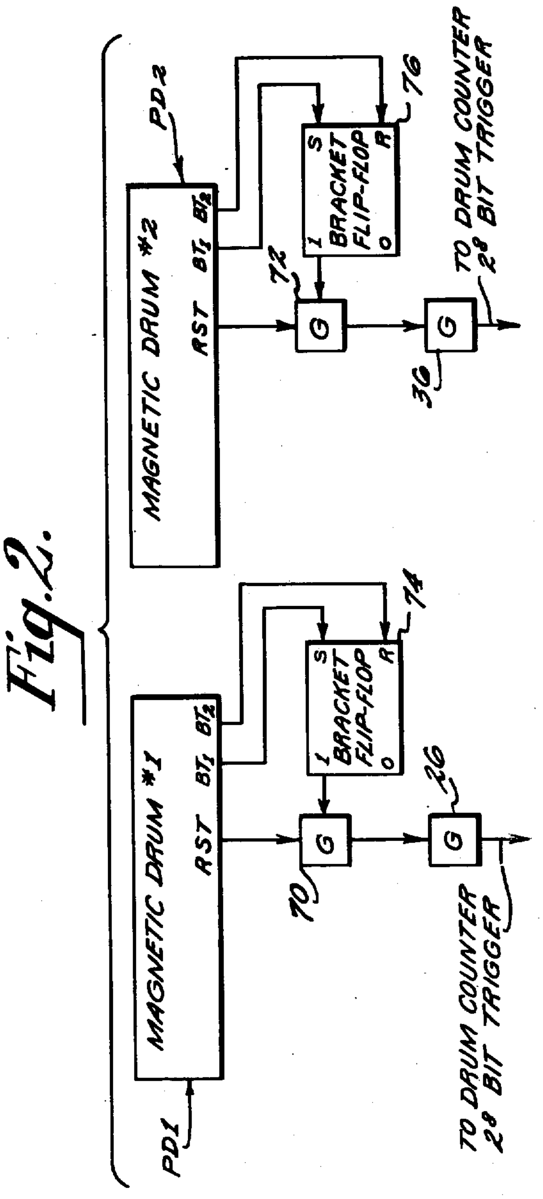
Figure 2 is a partial block diagram showing the additions required to be made to the diagram of Figure 1 in accordance with another embodiment of this invention.
Figure 3:
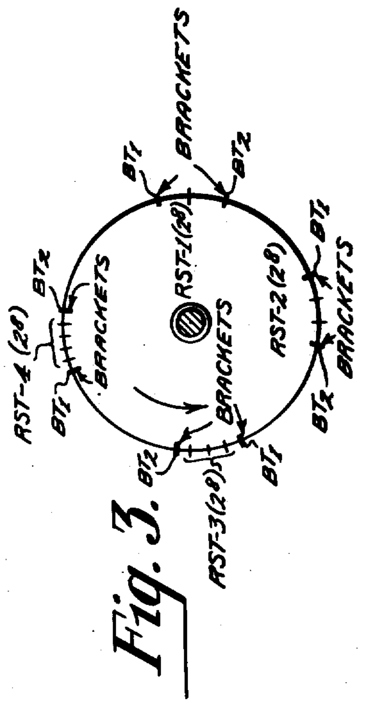
Figure 3 is a diagrammatic end of view of a magnetic drum illustrating the relative locations of the reset synchronizing signals and bracketing signals therefor.

Referring now to Figure 2, an alternative embodiment of this invention is described wherein the drum switching and synchronizing time is reduced still further. Only so much of the circuitry of Figure 1 is illustrated as is necessary to describe this alternative embodiment. Thus magnetic drums PD1 and PD2 are shown having as before a reset synchronizing track but containing four pulse groups placed every 90 degrees from the fiducial reset pulse. The output from the reset synchronizing track from each of the magnetic drums PD1 and PD2 are connected through "and" gates 70 and 72 respectively. A fourth and fifth track entitled bracket tracks (BT1 and BT2) are disposed on each of the magnetic drums PD1 and PD2. The bracket track BT1 consists of pulses each of which precedes a reset synchronizing group placed in a different one of the four quadrants. The bracket track BT2 consists of pulses each of which follow a reset synchronizing group. This is illustrated in Figure 3 by a diagrammatic end view showing the positions of the bracket pulses relative to the positions of the reset synchronizing track pulses. Thus the reset synchronizing track pulses are displaced around the periphery of the drum in each of the quadrants between each quadrant set of bracket track pulses. The last pulse (mark) of each of the coded groups of pulses in the reset synchronizing track is physically located in the example given at, or preceding the 90 degree point. This enables the drum counter DC to be set to the proper drum line address in time for the first synchronizing pulse from the succeeding quadrant.

By way of the further explanation, the reset synchronizing track in the first quadrant contains but one puse. That in the second quadrant two, that in the third quadrant three, and that in the fourth quadrant four pulses. In the alternative, the coded group of pulses and corresponding bracket track pulses for the fourth (last) quadrant may be eliminated and the reset track pulse relied upon since 4 ($2^8$) is 1024 which is zero for a drum counter having only 10 binary stages. The particular usage of these additional bracket tracks will become more apparent from the description below.

The outputs from the bracket tracks BT1 and BT2 are applied to the set and reset inputs respectively of bracket flip-flops 74 and 76, with each bracket flip-flop 74, 76 receiving the outputs of the bracket tracks of the corresponding drum PD1, PD2. The "one" outputs of the bracket track flip-flops 74 and 76 are applied respectively to the priming inputs of "and" gates 70 and 72. The outputs of "and" gates 70 and 72, are connected respectively to the reset synchronizing track "and" gates 26 and 36 of Figure 1. The outputs of these "and" gates 26 and 36 are connected respectively in this instance to the $2^8$ bit of the drum counter DC instead of the $2^9$ bit as is illustrated in Figure 1.

The operation of the circuit of Figure 2 is the same as that of Figure 1 with the exception that the output of the reset synchronizing track now triggers the drum counter DC to the nearest one quarter revolution drum line. Thus, the first reset synchronizing track pulse of Figure 3 provides a single pulse to the drum counter DC $2^8$ bit trigger input thereby triggering the drum counter to 256. Similarly, the second quadrant pulses trigger the drum counter to 512, the third to 768, and the final to 1024 or 0 since the drum counter DC contains no $2^{10}$ bit. The particular function of the bracket flip-flops 74 and 76 is to successively open the gates 70 and 72, respectively, during each quadrant of the drum revolutions, thereby permitting either one, two, three, or four sequential pulses to set the drum line counter DC to the proper next succeeding quadrant drum line location. Thus, as each PD1 or PD2 rotates a full quadrant, the corresponding bracket flip-flop 74 or 76 is set, thereby providing a high level "one" output to open the corresponding gate 70 or 72. Following the reset synchronizing pulses of each quadrant, the bracket flip-flops are again reset, thereby lowering the "one" output level of the flip-flop and disabling the gates 70 and 72.

In other embodiments, the periphery of the magnetic drums may be divided into eighths having bracket track pulses located to enclose each group of pulses from each of the eight sectors. In this event, of course, the $2^7$ bit of the drum line counter would be triggered by the reset synchronizing track if the magnetic drums utilized contained, as in the illustration given, 1023 lines.

By way of summary, rapid synchronization of the synchronizing track pulses is obtained by triggering a counter to the proper nearest identifying drum line as is determined by the number of synchronizing track pulses that have passed a given reference point. This is accomplished with the aid of three additional timing tracks. The first is a reset synchronizing track which consists of eight groups of serially recorded pulses. The number of pulses per group range from one to four and identify the group number. These pulses trigger the $2^7$ bit of the drum line counter DC thus setting this counter to the nearest drum quadrant in steps of 128 drum lines. A second track consisting of pulses, which precede these pulse groups, indicate when to start and when a third track consisting of pulses that follow these pulse groups indicate to stop the quadrant count. Alternatively, a triggerable bracket track flip-flop may be triggered by a single additional bracket track.

There has been hereinabove described a novel system for switching between independently driven cyclic storage media. The system provides a rapid means of changing to the synchronizing track of the newly selected storage medium in a short amount of time and without requiring a full cycle of the storage medium. The system is economical as well as simple.

What is claimed is:

1. In a system for storing data, the combination comprising a first and a second independent cyclic storage medium each having means to provide synchronizing signals corresponding to data storage locations, said first and said second medium each including means to provide a signal corresponding to a reference location, and means selectively responsive to said first and said second medium synchronizing and reference signals to deliver said data to and derive said data from either said first or said second cyclical storage medium.

2. In a system for storing data, the combination comprising a plurality of cyclic storage media each having means to provide synchronizing signals corresponding to data storage locations, each of said media including means to provide a signal corresponding to a reference location, a counting means adapted to count said synchronizing signals from any selected one of said media, said counting means being also responsive to said reference signals from any selected one of said media to reset said counting means to zero, and means responsive to a predetermined count of said counting means to deliver said data to and derive said data from any selected one of said media.

3. In a system for storing data on either a first or a second cyclic storage medium each having means to provide synchronizing signals corresponding to data storage locations in response to a select storage medium signal, the combination wherein said first medium and said second medium each including means for providing a first signal corresponding to a reference location, said first medium and said second medium each including means for providing a second signal corresponding to a location other than said reference location, and including means responsive to said select medium signal and selectively responsive to said synchronizing signals, said first signal, and said second signal from either said first or said second medium in accordance with said select signal to switch to said first or said second medium to deliver said data to and derive said data from said switched medium, in a shorter period of time.

4. In a data storage device having a first and a second magnetic drum each having means including gating means for providing synchronizing signals corresponding to data storage locations, a system for switching between said first and said second magnetic drums in response to drum select signals comprising, in combination, means included in said first and second magnetic drum for providing a first signal corresponding to a reference location, said first and said second magnetic drums each including means for providing a second signal corresponding to a location other than said reference location, gating means responsive to said first and second signals from each of said drums and responsive to said drum select signals, means responsive to said gating means from each of said drums to switch between said first and said second magnetic drums to deliver said data to said selected drum in a short period of time.

5. In a data storage device having a first and a second magnetic drum each including gating means for providing synchronizing signals corresponding to data storage locations, a system for switching between said first and said second magnetic drum in response to drum select signals comprising, in combination, means included in said first and second magnetic drum for providing a first signal corresponding to a reference location, said first and said second magnetic drums each including means for providing a second signal corresponding to a location other than said reference location, gating means responsive to said synchronizing signals and said first and said second signals from each of said drums, and a counter having a trigger, a reset and a set input, said trigger input being responsive to the output of said synchronizing signal gating means, said reset input being responsive to either said drum select signal or said output of said first signal gating means, said set input being responsive to the output of said second signal gating means, whereby synchronization and switching between said drum is achieved in a lesser time.

6. In a data storage device having a first and a second magnetic drum each having means including gating means for providing synchronizing signals corresponding to data storage locations, a system for switching between said first and said second magnetic drum in response to drum select signals comprising, in combination, means included in said first and second magnetic drum for providing a first signal corresponding to a reference location, said first and said second magnetic drums each including means for providing a second signal corresponding to a location other than said reference location, a drum selection unit for staticizing said drum select signal and for providing a change drum output signal in the event a succeeding select drum signal differs from a preceding drum select signal, a drum counter having a reset, a trigger, and a set input, an inhibit flip-flop having a reset input and output and a set input and output, and means including a gate responsive to said staticized drum select signal in said drum selection unit and to said first signal track in each of said magnetic drums for providing an output to the reset inputs of said drum counter and said inhibit flip-flop, the set input of said inhibit flip-flop and the reset input of said drum counter both being responsive to said change drum signal, means including gates responsive to said synchronizing tracks from each of said magnetic drums, to said staticized drum select signals, and to the reset output of said inhibit flip-flop for passing said synchronizing signals, said trigger input of said drum counter being responsive to said passed synchronizing signals, and means including a gate responsive to said second signals from each of said magnetic drums, to said staticized drum select signals from said drum selection unit, and to the set outputs from said inhibit flip-flop for passing said second signal to the set input of said drum counter and to the reset input of said inhibit flip-flop whereby switching and synchronizing between drums is accomplished in a small amount of time.

7. In combination with a data storage system having a first and a second independent cyclic storage medium each having means to provide synchronizing signals corresponding to data storage locations, a system for selectively switching from the synchronizing signals of said first drum to the synchronizing signals of said second drum, wherein said first and said second medium each include a first means for providing a signal corresponding to a reference location, and a second means for providing signals at preselected ones of said data storage locations, and means responsive to said first means signals and said second means signals for switching from the synchronizing signals of said first drum to the synchronizing signals of said second drum.

8. In combination with a data storage system having a first and a second independent cyclic storage medium each having means to provide synchronizing signals corresponding to data storage locations, a system for selectively switching from the synchronizing signals of said first drum to the synchronizing signals of said second drum, wherein said first and said second medium each include a first means for providing a signal corresponding to a reference location, and a second means for providing signals at preselected ones of said data storage locations, and a third means for providing signals marking said second means signal locations, and means responsive to said first, second, and third means signals for switching from the synchronizing signals of said first drum to the synchronizing signals of said second drum in a minimal time.

9. In combination with a data storage system having a first and a second independent magnetic drum each having means to provide synchronizing signals corresponding to data storage locations, a system for selectively switching from the synchronizing signals of said first drum to the synchronizing signals of said second drum, said system including a reset track having a fiducial reference mark, a reset synchronizing track having a plurality of coded drum location marks at preselected intervals, a first bracket track having a mark preceding each of said coded drum location marks, and a second bracket track having a mark succeeding each of said coded drum location marks, means to derive signals from the mark in each of the tracks, and means responsive to each of said derived signals to selectively switch from the synchronizing signals of said first drum to the synchronizing signals of said second drum in a minimal time.

10. In combination with a data storage system having a first and a second independent magnetic drum, each having means to provide synchronizing signals corresponding to data storage locations, a system for selectively switching from the synchronizing signals of said first drum to the synchronizing signals of said second drum, said system including a reset track having a fiducial reference mark, a reset synchronizing track having a plurality of coded drum location marks at preselected intervals, a first bracket track having a mark preceding each of said coded drum location marks, a second bracket track having a mark succeeding each of said coded drum location marks, means to derive signals from the mark in each of said tracks, and a counter selectively responsive to the synchronizing signals of said first and said second drum, said counter being responsive during said selective switching to said reset signal, to said coded signals, and to said first and said second bracket signals from said second drum to achieve a count corresponding to a preselected succeeding drum storage location, whereby the switching time from said first to said second drum is reduced.

11. The system as claimed in claim 10 which includes means for inhibiting during said selective switching said synchronizing signals from each of said drums.

12. The system as claimed in claim 10 wherein said means responsive to the first and second bracket track signals includes a bracket flip-flop having set and reset inputs and outputs respectively, said set input being responsive to said first bracket track signals, said reset input being responsive to said second bracket track signals, and said reset synchronizing signals derivation means being responsive to the set output of said bracket flip-flop.

13. In a data storage device having a first and a second magnetic drum, a system for switching from said first to said second drum in response to a switching signal, said storage device having means including a first and a second synchronizing track associated with both said first and said second drums, respectively, each of said tracks having signals corresponding to drum line storage locations, and means including a counter responsive to either of said synchronizing tracks to store and obtain said data from preselected ones of said drum line storage locations, said switching system comprising, in combination, a reset track displaced on each of said drums, each said reset track having a fiducial signal located at a point preceding said drum line storage locations, a reset synchronizing track displaced on each of said drums, each said reset synchronizing track having a fiducial signal located at a point other than said reset fiducial signal, means responsive to said switching signal to inhibit said synchronizing signals from said first drum, means responsive to said switching signal to derive said reset signal from reset signal track of said second drum, and to reset said counter to zero upon the occurrence of the reset signal, means responsive to said switching signal to derive said reset synchronizing signal from said reset synchronizing track and to set said counter upon the occurrence of the reset synchronizing signal to a count corresponding to the drum line storage location of said reset synchronizing signal, and means responsive also to said reset synchronizing signal to enable the synchronizing signals from said second drum, whereby the time required to correctly synchronize to said second drum is shortened.

14. The system as claimed in claim 13 wherein the each said reset synchronizing track contains groups of coded signals displaced at intervals, said coded signal being indicative of preselected ones of said drum line storage locations, wherein each of said drums is provided with two additional bracket tracks having signals located to set off each of the coded groups of said reset synchronizing track, means to derive said bracket track signals. and wherein said means to derive said reset synchronizing signals is also responsive to said bracket track signals, whereby said counter, is triggered to a count corresponding to the nearer drum line, thereby reducing said drum switching time.

15. A system for switching and synchronizing with a magnetic drum in response to a switching signal, said drum including a synchronizing track having synchronizing signals at fixed intervals, said system comprising, in combination, means to count said synchronizing signals, a first and a second track also displaced on said drum, said first track having a fiducial signal at a location corresponding to the first of said synchronizing signals, said second track having a fiducial signal at a drum location other than said first track fiducial signals, means to derive each of said signals from the drum tracks, means responsive to said switching signal to inhibit said synchronizing signals and reset the counting means to zero, means responsive to said first track, said second track, and said switching signal to set the counting means to a count corresponding to a near synchronizing signal and enable said synchronizing signals with that signal next following said near synchronizing signal, whereby the synchronizing and switching time is reduced.

16. In a data storage device having a first and a second magnetic drum each having means including gating means for providing synchronizing signals corresponding to data storage locations, a system for switching between said first and said second magnetic drum in response to drum select signals comprising, in combination, means included in said first and second magnetic drum for providing a first signal corresponding to a reference location, said first and said second magnetic drums each including means for providing a second signal corresponding to a location other than said reference location, gating means responsive to said first and second signals from each of said drums and responsive to said drum select signals, means responsive to said gating means from each of said drums to switch between said first and said second magnetic drums to derive said data from said selected drum in a shorter period of time.

17. In a data storage system of the type including a first and a second magnetic drum, each of said drums having a synchronizing signal track, means to derive synchronizing signals from a selected one of said synchronizing signal tracks, and means responsive to either of said synchronizing signals to store data on either of said magnetic drums, the improvement comprising means responsive to a switching signal to switch from the selected first to said second drum, said switching means comprising a first signal track on each said drums having fiducial reference pulse at a drum location corresponding to the first of said synchronizing signals, a second signal track on each of said drums having a fiducial pulse located at a preselected drum point different than said reference pulse, and means responsive to said reference pulse of said second drum, to said second signal track fiducial pulse of said second drum, and to said switching signal to obtain rapidly synchronization with said second drum.

18. In a data storage system of the type including a first and a second magnetic drum, each of said drums having a synchronizing signal track, means to derive synchronizing signals from a selected one of said synchronizing signal tracks, and means including a counter responsive to each of said synchronizing signals to store data at preselected data storage locations on each of said magnetic drums, the improvement comprising means responsive to a switching signal to switch from the selected first to said second drum, said switching means comprising a first signal track on each said drums having a fiducial reference pulse at a drum location corresponding to the first of said synchronizing signals, a second signal track on each of said drums having a fiducial pulse located at a preselected drum point different than said reference pulse, and means including said counter responsive to said switching signal, to said reference pulse of said second drum, and to said second signal track fiducial pulse of said second drum to obtain a count in synchronism with said second drum synchronizing signals in a reduced amount of time.

References Cited in the file of this patent

UNITED STATES PATENTS 2,617,704 Mallina ---------------- Nov. 11, 1952

OTHER REFERENCES

"Universal High-Speed Digital Computers: A Magnetic Store" (Williams et al.), proceedings of Institute of Electrical Engineers, April 1952.